(12) United States Patent
Shimomura et al.

(10) Patent No.: US 9,747,953 B1
(45) Date of Patent: Aug. 29, 2017

(54) DISK DRIVE BASE UNIT WITH COMMUNICATING GROOVE EXTENDING OUTSIDE OUTER CIRCUMFERENTIAL PORTION OF CONNECTOR

(71) Applicant: Nidec Corporation, Kyoto (JP)

(72) Inventors: Takumi Shimomura, Kyoto (JP); Shingo Suginobu, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/426,224

(22) Filed: Feb. 7, 2017

(30) Foreign Application Priority Data

Feb. 25, 2016 (JP) .................................. 2016-034376

(51) Int. Cl.
*G11B 33/12* (2006.01)
*G11B 33/02* (2006.01)
*G11B 33/14* (2006.01)

(52) U.S. Cl.
CPC .......... *G11B 33/122* (2013.01); *G11B 33/022* (2013.01); *G11B 33/1466* (2013.01)

(58) Field of Classification Search
None
See application file for complete search history.

(56) References Cited

U.S. PATENT DOCUMENTS

| 7,271,974 B2 | 9/2007 | Fukuyama et al. |
| 2013/0271871 A1* | 10/2013 | Watanabe et al. ... G11B 33/122 360/99.08 |

FOREIGN PATENT DOCUMENTS

JP 2006-040423 A 2/2006

* cited by examiner

*Primary Examiner* — Craig A. Renner
(74) *Attorney, Agent, or Firm* — Keating & Bennett, LLP

(57) ABSTRACT

A base member of a disk drive apparatus includes a window portion, a first groove, and a communicating groove. The window portion passes through a bottom plate portion of the base member in an axial direction. The first groove is defined in an upper surface of the bottom plate portion around the window portion. A connector includes a board portion and an electrode terminal on a lower surface of the board portion. The board portion is on the upper surface of the bottom plate portion to cover the window portion, the first groove, and a portion of the communicating groove. The communicating groove extends from the first groove up to a position outside of an outer circumferential portion of the connector. An adhesive layer is between the upper surface of the bottom plate portion and the lower surface of the board portion.

12 Claims, 15 Drawing Sheets

US 9,747,953 B1

DISK DRIVE BASE UNIT WITH COMMUNICATING GROOVE EXTENDING OUTSIDE OUTER CIRCUMFERENTIAL PORTION OF CONNECTOR

CROSS REFERENCE TO RELATED APPLICATIONS

This application claims the benefit of priority to Japanese Patent Application No. 2016-034376 filed on Feb. 25, 2016. The entire contents of this application are hereby incorporated herein by reference.

BACKGROUND OF THE INVENTION

1. Field of the Invention

The present invention relates to a base unit, a spindle motor, and a disk drive apparatus.

2. Description of the Related Art

Hard disk drives typically have spindle motors arranged to rotate disks installed therein. A known hard disk drive and a known spindle motor are described in, for example, JP-A 2006-040423. Paragraph of this publication states that the spindle motor (SPM) is fixed to a base of the hard disk drive (HDD). In addition, paragraph of the publication states that a low-density gas having a density lower than that of air, such as, for example, helium, is used as an atmosphere inside a hard disk assembly (HDA).

A flexible printed circuit board is arranged inside the hard disk drive to supply an electric drive current to a head arranged to perform reading and writing of information from or to a disk. The flexible printed circuit board is connected to an external power supply through a through hole defined in the base. However, a case of the hard disk drive needs to be airtight to keep an interior space thereof clean. Therefore, it is required to seal the aforementioned through hole.

In a known hard disk drive including a base including a through hole, a connector for a flexible printed circuit board is arranged on an upper surface of the base to seal the through hole. However, in the case where an interior of a case is filled with a low-density gas, such as, for example, helium, which tends to easily pass through even a minute gap, as in the case of the hard disk drive described in JP-A 2006-040423, particularly high airtightness is required. Therefore, simply closing the through hole with the connector may fail to prevent a leakage of the low-density gas.

It is conceivable to arrange an adhesive layer between an area surrounding the through hole and the connector, for example, to prevent a leakage of the low-density gas out of the case. In this case, a groove may be defined in the area surrounding the through hole, and an adhesive may be held in this groove. This arrangement contributes to preventing the adhesive from protruding into the through hole or outwardly of the connector, and thus preventing the adhesive from making contact with an electrode terminal of the connector or various electrical wiring arranged around the connector. However, when the connector is fixed to the base through adhesion, a gas bubble may be introduced into the adhesive or the groove, and any gas bubble being introduced might result in a failure to achieve a sufficient adhesive strength and a sufficient sealing area.

SUMMARY OF THE INVENTION

According to a preferred embodiment of the present invention, there is provided a base unit for use in a disk drive apparatus including a case an interior of which is filled with helium, hydrogen, a gas mixture of helium and hydrogen, or a gas mixture of air and any one of helium, hydrogen, and the gas mixture of helium and hydrogen. The base unit includes a base member arranged to support a motor, and a connector electrically connected to a head included in an access portion arranged to perform at least one of reading and writing of information from or to a disk supported by a rotating portion of the motor. The base member includes a bottom plate portion arranged to extend perpendicularly to a central axis of the motor; a window portion arranged to pass through the bottom plate portion in an axial direction; and a first groove defined in an upper surface or a lower surface of the bottom plate portion around the window portion. The connector includes a board portion arranged on the upper surface or the lower surface of the bottom plate portion, and arranged to cover the window portion and at least a portion of the first groove; and an electrode terminal arranged on the board portion. The electrode terminal is arranged on an upper or lower side of the window portion. An adhesive layer is arranged between the bottom plate portion and a surface of the board portion facing the bottom plate portion. The adhesive layer is arranged to define a continuous closed loop around the window portion. A portion of the adhesive layer is held in at least a portion of the first groove. The first groove includes at least one communicating groove arranged to extend up to a position outside of an outer circumferential portion of the connector.

According to the above preferred embodiment of the present invention, any gas bubble in the first groove could be discharged to an external space through the communicating groove. This leads to a sufficient adhesive strength and a sufficient sealing area.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a spindle motor is referred to by the term "axial direction", "axial", or "axially", that directions perpendicular to the central axis of the spindle motor are each referred to by the term "radial direction", "radial", or "radially", and that a direction along a circular arc centered on the central axis of the spindle motor is referred to by the term "circumferential direction", "circumferential", or "circumferentially". It is also assumed herein that an axial direction is a vertical direction, and that a side on which a cover is arranged with respect to a bottom plate portion of a base member is an upper side, and the shape of each member or portion and relative positions of different members or portions will be described based on the above assumptions. Note, however, that the above definitions of the vertical direction and the upper and lower sides are simply made for the sake of convenience in description, and should not be construed to restrict the orientation of a base unit, a spindle motor, or a disk drive apparatus according to any preferred embodiment of the present invention when in use.

Also note that the term "parallel" as used herein includes both "parallel" and "substantially parallel". Also note that the term "perpendicular" as used herein includes both "perpendicular" and "substantially perpendicular".

Figure 1:
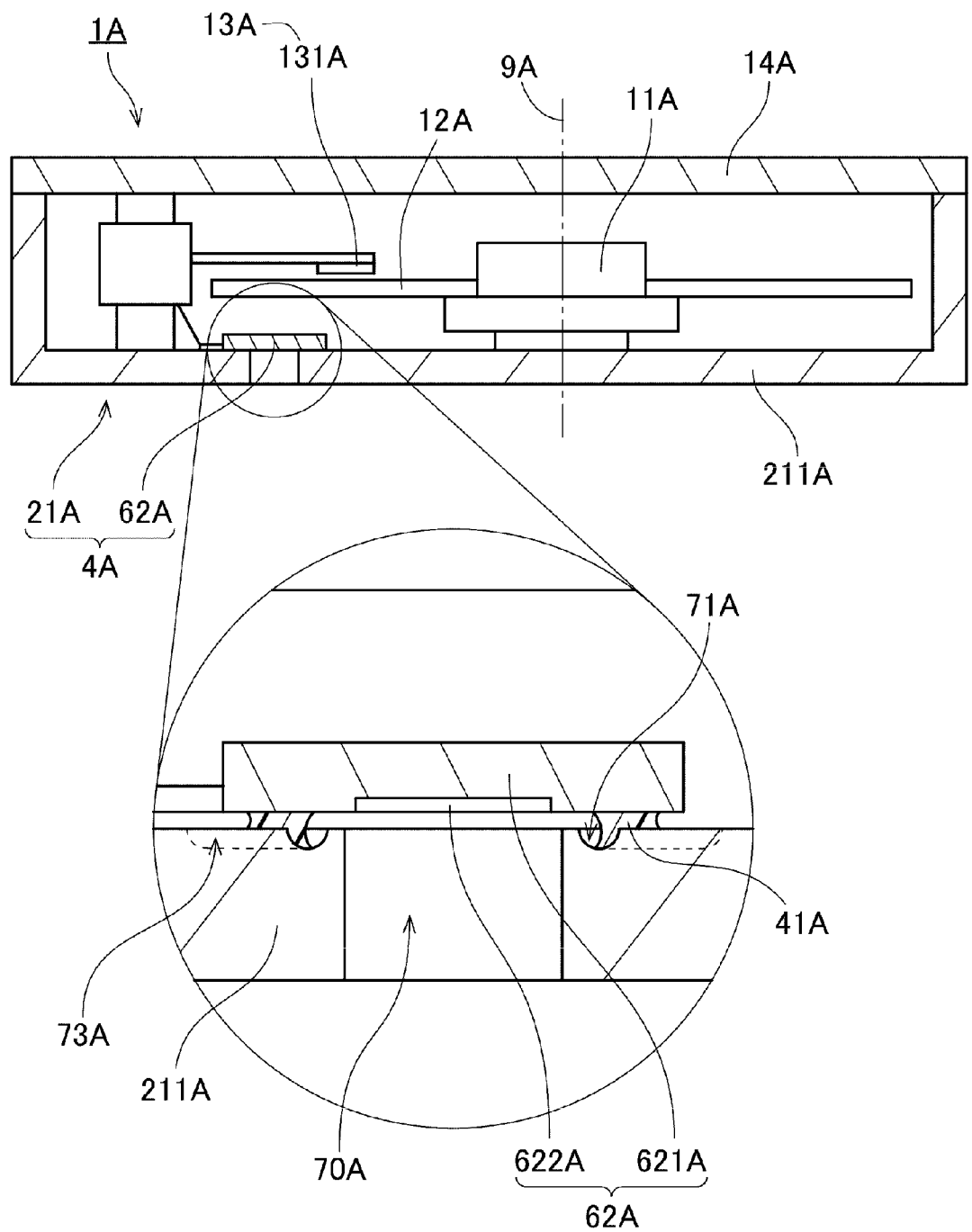
FIG. 1 is a vertical sectional view of a disk drive apparatus according to a first preferred embodiment of the present invention.

FIG. 1 is a vertical sectional view of a disk drive apparatus 1A according to a first preferred embodiment of the present invention. This disk drive apparatus 1A includes a case defined by a base member 21A and a cover 14A. An interior of the case is filled with helium, hydrogen, a gas mixture of helium and hydrogen, or a gas mixture of any one of the above and air. Referring to FIG. 1, a base unit 4A used in the disk drive apparatus 1A includes the base member 21A and a connector 62A.

The base member 21A is arranged to support a motor 11A. In addition, the base member 21A includes a bottom plate portion 211A, a window portion 70A, and a first groove 71A. The bottom plate portion 211A is arranged to extend perpendicularly to a central axis 9A of the motor 11A. The window portion 70A is arranged to pass through the bottom plate portion 211A in the axial direction. The first groove 71A is defined in an upper surface of the bottom plate portion 211A around the window portion 70A.

The connector 62A is electrically connected to a head 131A included in an access portion 13A of the disk drive apparatus 1A. The access portion 13A is arranged to perform at least one of reading and writing of information from or to a disk 12A supported by the motor 11A through an electric current supplied from the connector 62A. The connector 62A includes a board portion 621A and an electrode terminal 622A. The board portion 621A is arranged on the upper surface of the bottom plate portion 211A. In addition, the board portion 621A is arranged to cover the window portion 70A and the first groove 71A. The electrode terminal 622A is arranged on a lower surface of the board portion 621A.

As illustrated in an enlarged view in FIG. 1, the electrode terminal 622A is arranged on the upper side of the window portion 70A. In addition, an adhesive layer 41A is arranged between the upper surface of the bottom plate portion 211A and the lower surface of the board portion 621A. The bottom plate portion 211A and the board portion 621A are thus fixed to each other. In addition, the adhesive layer 41A is arranged to define a continuous closed loop around the window portion 70A. A communication through the window portion 70A is thus blocked. That is, the adhesive layer 41A fulfills both the role of fixing the board portion 621A to the bottom plate portion 211A and the role of blocking the communication through the window portion 70A.

In addition, when the connector 62A is adhered to the base member 21A, a portion of the adhesive layer 41A before being cured is accumulated in the first groove 71A. As a result, a portion of the adhesive layer 41A is held in at least a portion of the first groove 71A. This contributes to preventing the adhesive layer 41A from protruding into the window portion 70A or outwardly of the connector 62A.

Further, the first groove 71A includes a communicating groove 73A arranged to extend from a portion of the first groove 71A up to a position outside of an outer circumferential portion of the connector 62A. That is, the communicating groove 73A is a groove extending up to a position outside of an area of the upper surface of the bottom plate portion 211A which is covered with the connector 62A. The communicating groove 73A is arranged to be in communication with a space outside of an outer circumference of the connector 62A to allow any gas bubble existing in the adhesive or in the first groove 71A at the time of the adhesion to be discharged to a space outside of the board portion 621A through the communicating groove 73A.

Figure 2:
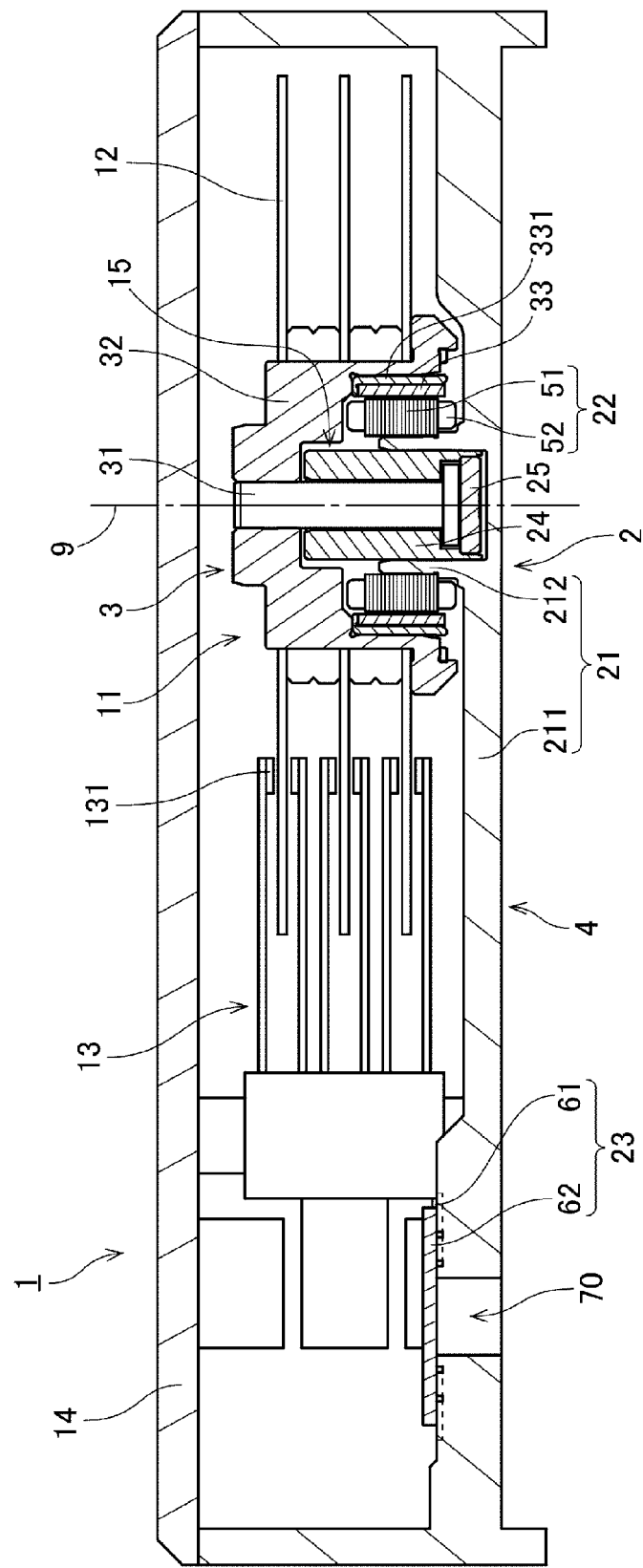
FIG. 2 is a vertical sectional view of a disk drive apparatus according to a second preferred embodiment of the present invention.

FIG. 2 is a vertical sectional view of a disk drive apparatus 1 according to a second preferred embodiment of the present invention. The disk drive apparatus 1 is an apparatus arranged to perform reading and writing of information from or to magnetic disks 12 while rotating the magnetic disks 12. As illustrated in FIG. 2, the disk drive apparatus 1 includes a spindle motor 11, the magnetic disks 12, which are three in number, an access portion 13, and a cover 14.

The spindle motor 11 is arranged to rotate the three magnetic disks 12 about a central axis 9 while supporting the magnetic disks 12. The disk drive apparatus 1 includes a base member 21 arranged to support the spindle motor 11. A rotating portion 3 of the spindle motor 11, the three magnetic disks 12, and the access portion 13 are housed in a case defined by the base member 21 and the cover 14. The access portion 13 is arranged to move heads 131 along recording surfaces of the magnetic disks 12 to perform the reading and the writing of information from or to the magnetic disks 12.

A junction of the base member 21 and the cover 14 is sealed by a sealant, such as, for example, an elastomer. In addition, an interior of the case defined by the base member 21 and the cover 14 is filled with helium, hydrogen, a gas mixture of helium and hydrogen, or a gas mixture of any one of the above and air. Each of the above gases has a density lower than that of air outside of the case. Accordingly, viscous drag which is applied to each of the magnetic disks 12 and the access portion 13 is low. This leads to a reduction in a windage loss of each of the magnetic disks 12 and the access portion 13 while the disk drive apparatus 1 is in operation.

Note that the disk drive apparatus 1 may alternatively be arranged to include one, two, or more than three magnetic disks 12. Also note that the access portion 13 may alternatively be arranged to perform only one of the reading and the writing of information from or to the magnetic disk(s) 12.

Next, the structure of the above-described spindle motor 11 will now be described below. Referring to FIG. 2, the spindle motor 11 includes a stationary portion 2 and the rotating portion 3. The stationary portion 2 is arranged to be stationary relative to both the base member 21 and the cover 14. The rotating portion 3 is supported to be rotatable with respect to the stationary portion 2.

The stationary portion 2 according to the present preferred embodiment includes the base member 21, an armature 22, a sleeve 24, and a cap 25.

The base member 21 is arranged to support the armature 22 and the sleeve 24. The base member 21 is made of a metal, and is obtained by, for example, casting of an aluminum alloy. Referring to FIG. 2, the base member 21 includes a bottom plate portion 211 and a cup portion 212 having a bottom and being substantially cylindrical. The bottom plate portion 211 is arranged to extend perpendicularly to the central axis 9 below the rotating portion 3, the magnetic disks 12, and the access portion 13. The cup portion 212 is arranged to be coaxial or substantially coaxial with the central axis 9.

The armature 22 includes a stator core 51 and a plurality of coils 52. The stator core 51 is, for example, defined by laminated steel sheets, that is, electromagnetic steel sheets, such as silicon steel sheets, placed one upon another in the axial direction. The stator core 51 is fixed to an outer circumferential surface of the cup portion 212. In addition, the stator core 51 includes a plurality of teeth arranged to project radially outward. Each coil 52 is defined by a conducting wire wound around a separate one of the teeth.

An electrical wiring portion 23 is arranged on an upper surface of the bottom plate portion 211, and is electrically connected to the heads 131 and adjacent portions of the disk drive apparatus 1. The electrical wiring portion 23 includes a flexible printed circuit board 61 and a connector 62. Electric drive currents are supplied from an external power supply to the heads 131 and the adjacent portions of the disk drive apparatus 1 through the connector 62 and the flexible printed circuit board 61. In the present preferred embodiment, the base member 21 and the electrical wiring portion 23 together define a base unit 4. The structure of the base unit 4 will be described in more detail below.

The sleeve 24 is arranged to extend in the axial direction to assume a substantially cylindrical shape around a shaft 31, which will be described below. A lower portion of the sleeve 24 is housed in the cup portion 212, and is fixed to the cup portion 212 through, for example, an adhesive. An inner circumferential surface of the sleeve 24 is arranged radially opposite to an outer circumferential surface of the shaft 31. In addition, a lower opening of the sleeve 24 is closed by the cap 25.

The rotating portion 3 according to the present preferred embodiment includes the shaft 31, a hub 32, and a magnet 33.

The shaft 31 is arranged to extend in the axial direction radially inside of the sleeve 24. A metal, such as, for example, stainless steel, is used as a material of the shaft 31. An upper end portion of the shaft 31 is arranged to project upward above an upper surface of the sleeve 24. In addition, a lubricating fluid is arranged between the shaft 31 and a combination of the sleeve 24 and the cap 25. The shaft 31 is supported through the lubricating fluid to be rotatable with respect to the sleeve 24 and the cap 25.

That is, in the present preferred embodiment, a bearing mechanism 15 is defined by the combination of the sleeve and the cap 25, both of which belong to the stationary portion 2, the shaft 31, which belongs to the rotating portion 3, and the lubricating fluid arranged therebetween. A polyolester oil or a diester oil, for example, is used as the lubricating fluid.

The hub 32 is arranged to extend radially outward and downward from a peripheral portion of the upper end portion of the shaft 31. An inner circumferential portion of the hub 32 is fixed to the upper end portion of the shaft 31. The three magnetic disks 12 are supported by the hub 32. In addition, the magnet 33 is fixed to the hub 32 with a back yoke 331 made of a magnetic material therebetween. A radially inner surface of the magnet 33 is arranged radially opposite to each of the teeth of the stator core 51. In addition, the radially inner surface of the magnet 33 includes north and south poles arranged to alternate with each other in a circumferential direction.

Once electric drive currents are supplied to the coils 52 in the spindle motor 11 as described above, radial magnetic flux is generated around each of the teeth of the stator core 51. Then, interaction between the magnetic flux of the teeth and magnetic flux of the magnet 33 produces a circumferential torque, so that the rotating portion 3 is caused to rotate about the central axis 9 with respect to the stationary portion 2. The magnetic disks 12 supported by the hub 32 are caused to rotate about the central axis 9 together with the rotating portion 3.

Next, the structure of the base unit 4 will now be described in more detail below.

Figure 3:
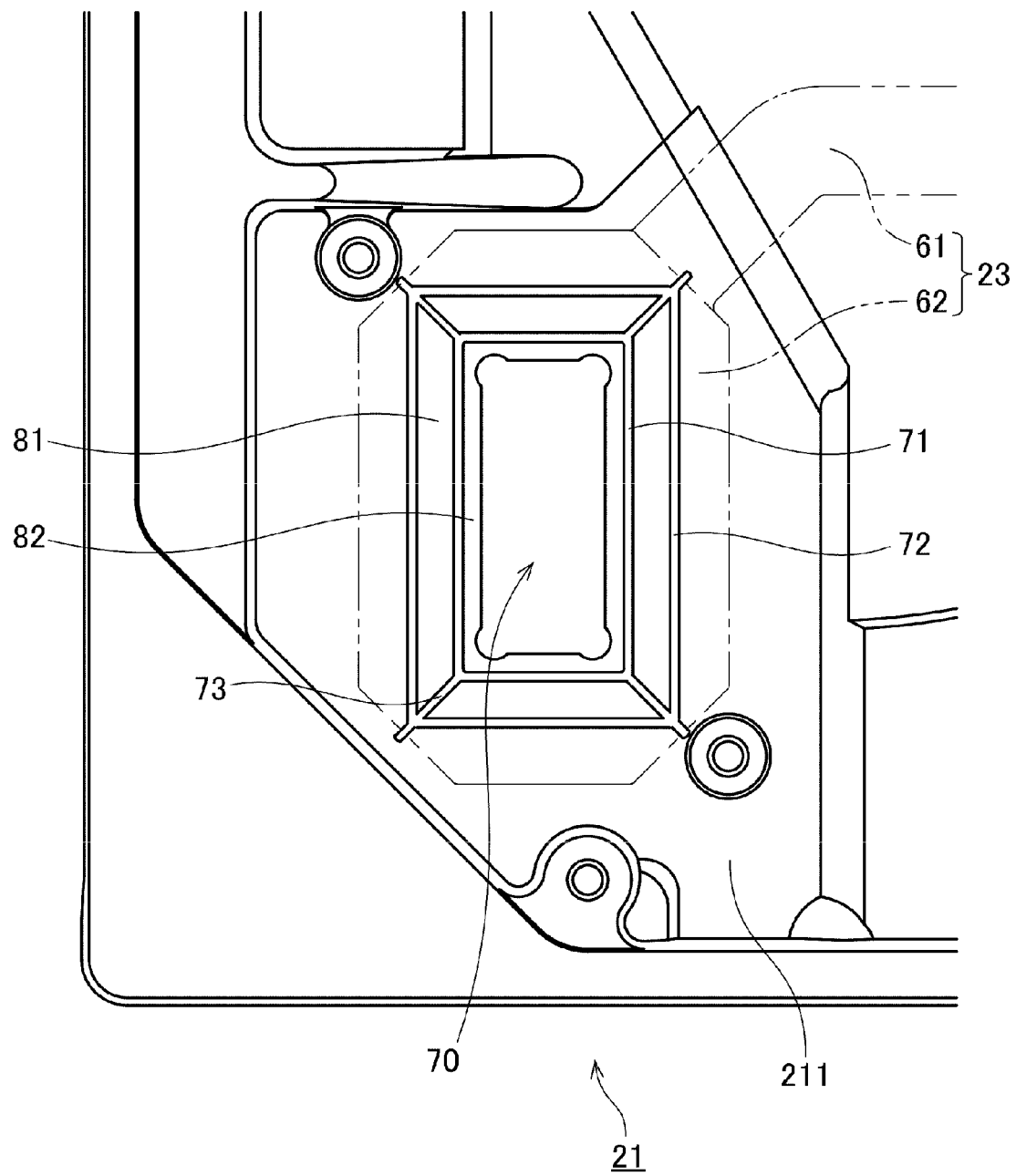
FIG. 3 is a partial top view of a base unit according to the second preferred embodiment.

FIG. 3 is a partial top view of the base member 21. In FIG. 3, the electrical wiring portion 23 is represented by a chain double-dashed line. Referring to FIG. 3, the base member includes a window portion 70. The window portion 70 is a through hole arranged to pass through the bottom plate portion 211 in the axial direction. In addition, the base member 21 includes, around the window portion 70, a first groove 71, a second groove 72, four communicating grooves 73, a first base upper surface 81, and a second base upper surface 82.

Each of the first and second grooves 71 and 72 and the four communicating grooves 73 is defined in the upper surface of the bottom plate portion 211. Each of the first and second grooves 71 and 72 according to the present preferred embodiment is a groove in the shape of a closed loop. The first groove 71 is arranged to surround the window portion 70. In addition, the second groove 72 is arranged to surround the window portion 70 and the first groove 71. That is, the second groove 72 is arranged on the outer side of the first groove 71 with respect to the window portion 70.

Each of the four communicating grooves 73 is a groove arranged to extend from a portion of the first groove 71 to join the second groove 72 on the outer side, and further extend up to a position outside of an outer circumferential portion of the connector 62. That is, as illustrated in FIG. 3, each communicating groove 73 is arranged to extend up to a position outside of an area (i.e., a portion represented by a chain double-dashed line) of the upper surface of the bottom plate portion 211 which is covered with the connector 62.

The first base upper surface 81 is arranged to extend in a closed loop between the first and second grooves 71 and 72.

That is, the first base upper surface 81 is arranged to extend from an edge portion of the first groove 71 on the outer side with respect to the window portion 70 to the outer side to reach an edge portion of the second groove 72 on the side closer to the window portion 70. The second groove 72 is arranged on the outer side of the first base upper surface 81 with respect to the window portion 70. In addition, the second base upper surface 82 is arranged to extend in a closed loop between the window portion 70 and the first groove 71. That is, the second base upper surface 82 is arranged to extend from an edge portion of the window portion 70 to the outer side with respect to the window portion 70 to reach an edge portion of the first groove 71 on the side closer to the window portion 70.

Figure 4:
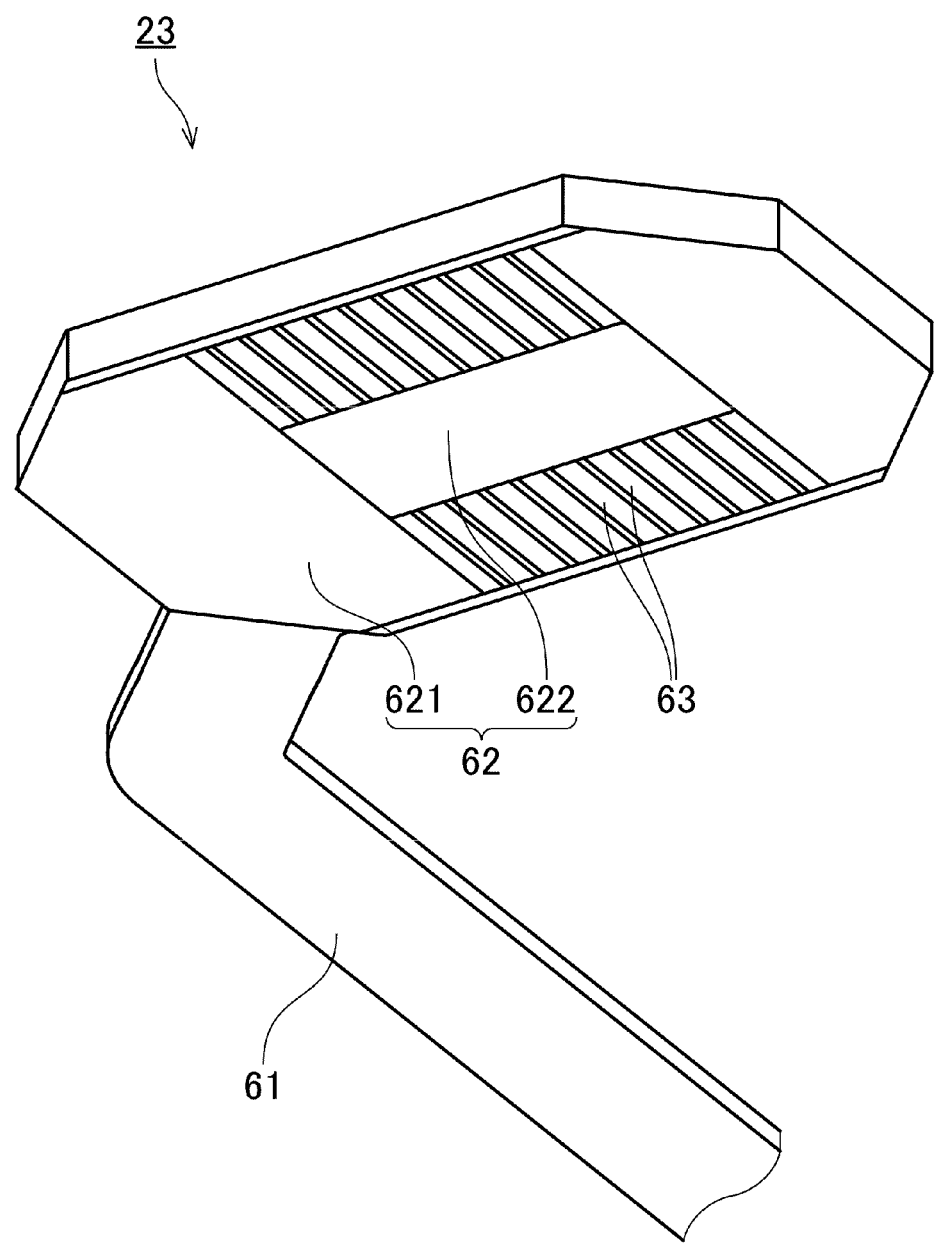
FIG. 4 is a perspective view of a connector according to the second preferred embodiment.

FIG. 4 is a partial perspective view of the electrical wiring portion 23. As illustrated in FIG. 4, the connector 62 of the electrical wiring portion 23 includes a board portion 621 and an electrode terminal 622. The axial thickness and rigidity of the board portion 621 are greater than the axial thickness and rigidity, respectively, of the flexible printed circuit board 61. The electrode terminal 622 is a portion of the connector 62 to which an end portion of a lead wire extending from a power supply unit is connected. The electrode terminal 622 is arranged on a lower surface of the board portion 621. In addition, a plurality of grooves 63 are defined in the lower surface of the board portion 621. The grooves 63 are arranged to extend from an edge portion of the electrode terminal 622 toward an edge portion of the board portion 621 in parallel with one another.

Figure 5:
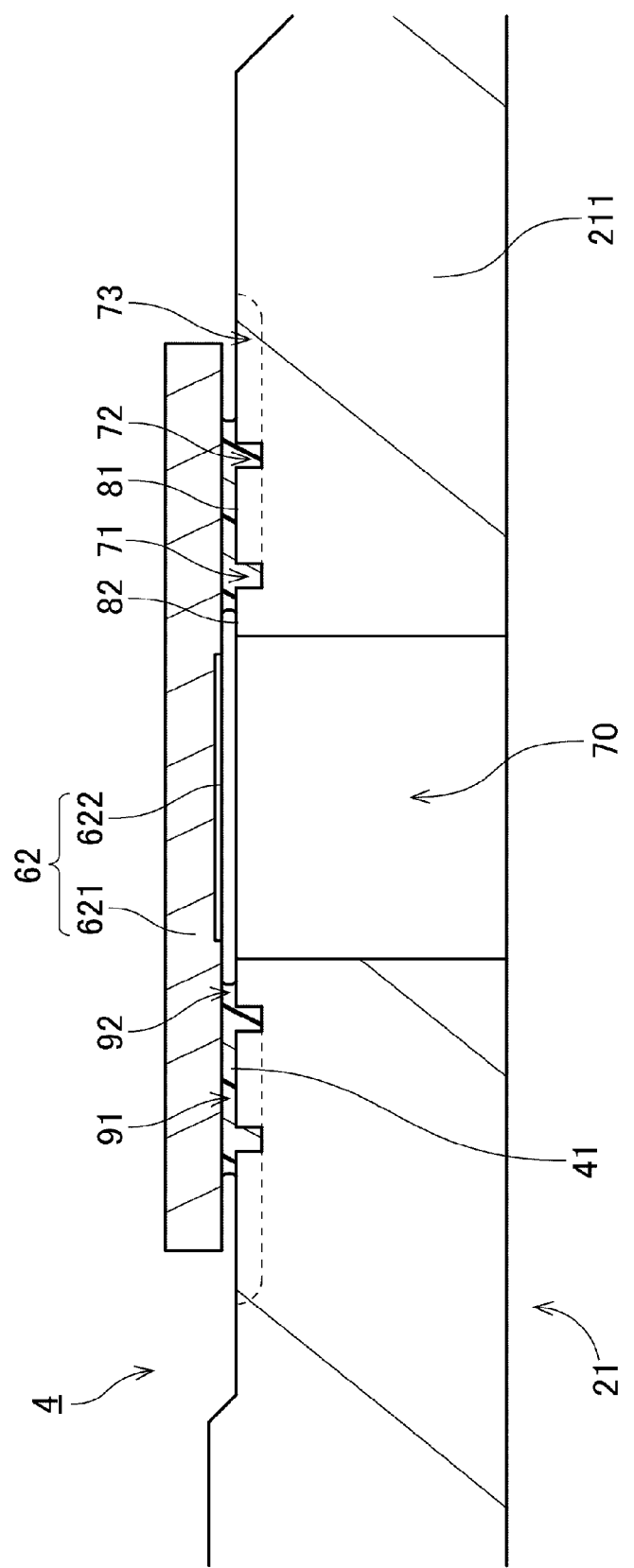
FIG. 5 is a partial vertical sectional view of the base unit according to the second preferred embodiment.

FIG. 5 is a partial vertical sectional view of the base unit 4. As illustrated in FIG. 5, the board portion 621 of the connector 62 is arranged on the upper surface of the bottom plate portion 211. The window portion 70, the first and second grooves 71 and 72, and a portion of each communicating groove 73 are covered with the board portion 621. In addition, as illustrated in FIG. 5, a space defining the window portion 70 and the electrode terminal 622 are arranged to axially overlap with each other. That is, the electrode terminal 622 is arranged on the upper side of the window portion 70. The electrode terminal 622 is thus exposed, facing toward a space below a lower surface of the base member 21. This allows the power supply unit, which is arranged outside of the disk drive apparatus 1, to be electrically connected to the electrode terminal 622 of the connector 62 through the lead wire.

In addition, as illustrated in FIG. 5, an adhesive layer 41 is arranged between the upper surface of the bottom plate portion 211 and the lower surface of the board portion 621. In the present preferred embodiment, the adhesive layer 41 is held in the first groove 71, the second groove 72, each communicating groove 73, a first gap 91 between the first base upper surface 81 and the lower surface of the board portion 621, and a second gap 92 between the second base upper surface 82 and the lower surface of the board portion 621. The bottom plate portion 211 and the board portion 621 are fixed to each other through this adhesive layer 41. An epoxy resin adhesive, for example, is used for the adhesive layer 41.

In addition, the adhesive layer 41 is arranged to define a continuous closed loop around the window portion 70. Accordingly, a communication between a space on the upper side of the bottom plate portion 211 and a space on the lower side of the bottom plate portion 211 through the window portion 70 is blocked by the adhesive layer 41. As a result, an interior space of the case defined by the base member 21 and the cover 14 is kept airtight. Thus, the gas, such as, for example, helium, is prevented from leaking out of the case.

That is, the adhesive layer 41 according to the present preferred embodiment fulfills both the role of fixing the board portion 621 to the bottom plate portion 211 and the role of sealing the window portion 70.

Figure 6:
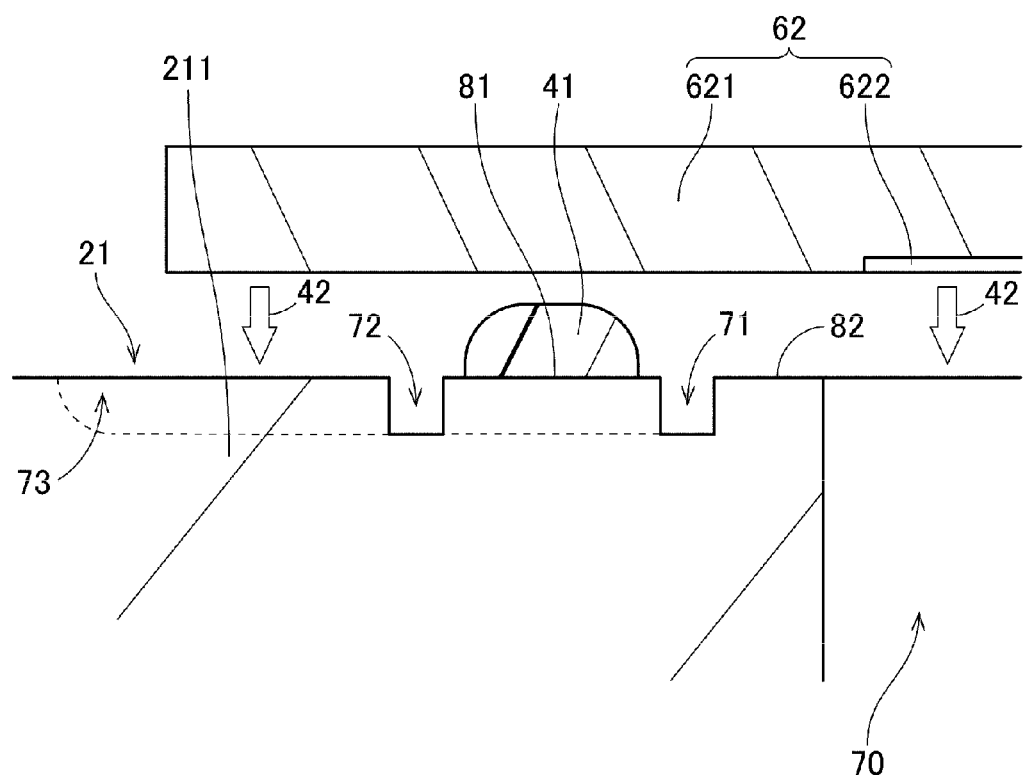
FIG. 6 is a vertical sectional view illustrating a manner of adhesion according to the second preferred embodiment.
Figure 7:
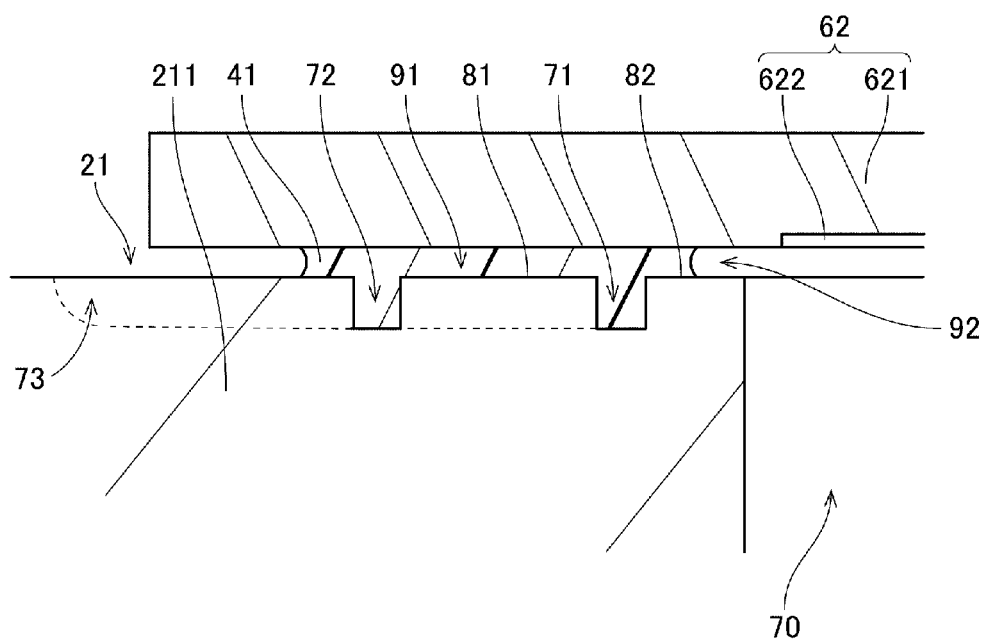
FIG. 7 is a vertical sectional view illustrating the manner of adhesion according to the second preferred embodiment.

FIGS. 6 and 7 are vertical sectional views illustrating how the board portion 621 is adhered to the bottom plate portion 211. When the board portion 621 is adhered to the bottom plate portion 211, the adhesive layer 41 is first applied to the first base upper surface 81 to define a closed loop as illustrated in FIG. 6. The volume of the adhesive layer 41 applied here is greater than a volume that the first gap 91 will have after manufacture of the disk drive apparatus 1 is completed. Next, as indicated by white arrows 42 in FIG. 6, the connector 62 is brought closer to the upper surface of the bottom plate portion 211. As a result, as illustrated in FIG. 7, the bottom plate portion 211 and the board portion 621 are fixed to each other through the adhesive layer 41. That is, the adhesive layer 41 is arranged between the bottom plate portion 211 and the board portion 621.

At this time, as the connector 62 is brought closer to the upper surface of the bottom plate portion 211, the adhesive layer 41 spreads between the upper surface of the bottom plate portion 211 and the lower surface of the board portion 621. It is to be noted that a portion of the spread adhesive layer 41 is held in at least a portion of the first groove 71. This limits spreading of the adhesive layer 41 toward the window portion 70. As a result, the adhesive is restrained from protruding into the window portion 70. In particular, the first groove 71 according to the present preferred embodiment is arranged to define a continuous closed loop around the window portion 70 as illustrated in FIG. 3. Therefore, the adhesive is restrained from protruding into the window portion 70 all the way around the window portion 70.

In addition, another portion of the adhesive layer 41 is held in at least a portion of the second groove 72. This limits spreading of the adhesive toward an edge portion of the connector 62. As a result, the adhesive is restrained from protruding outwardly of the connector 62. In particular, the second groove 72 according to the present preferred embodiment is arranged to define a continuous closed loop around the first base upper surface 81 as illustrated in FIG. 3. Therefore, the adhesive is restrained from protruding outwardly of the connector 62 all the way around the connector 62.

In addition, as illustrated in FIG. 7, the adhesive layer 41 according to the present preferred embodiment is arranged to extend not only in the first gap 91, the first groove 71, and the second groove 72, but also in the second gap 92. This further increases strength with which the base member 21 and the board portion 621 are fixed to each other, and also more effectively prevents the communication through the window portion 70. In particular, in the present preferred embodiment, the second gap 92 is arranged to have a substantially constant axial dimension between the first groove 71 and the window portion 70. This allows the adhesive layer 41 to easily make contact with both the second base upper surface 82 and the lower surface of the board portion 621. This in turn increases the strength with which the base member 21 and the board portion 621 are fixed to each other, and also leads to more secure blocking of the communication through the window portion 70.

Figure 8:
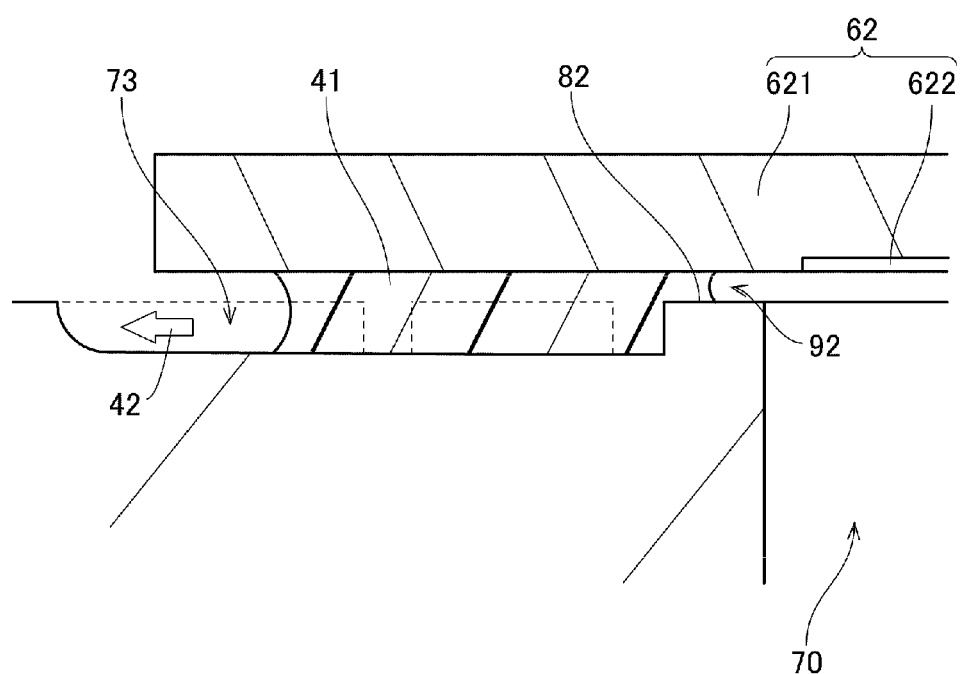
FIG. 8 is a vertical sectional view illustrating a communicating groove according to the second preferred embodiment.

Referring to FIG. 8, it is desirable that, when the bottom plate portion 211 and the board portion 621 are adhered to each other, any gas that exists between the bottom plate portion 211 and the board portion 621 be discharged into the window portion 70 or outwardly of the connector 62. In this connection, each communicating groove 73 is arranged to extend from a portion of the first groove 71 to join a portion of the second groove 72 on the outer side, and further extend up to a position outside of the outer circumferential portion of the connector 62. That is, each communicating groove 73 is a groove extending up to a position outside of an area of the upper surface of the bottom plate portion 211 which is covered with the connector 62. Accordingly, at the time of the adhesion, any gas that exists in the adhesive, the first groove 71, or the second groove 72 can be discharged outwardly of the area of the upper surface of the bottom plate portion 211 which is covered with the connector 62 along the communicating groove 73.

Further, the plurality of grooves 63 illustrated in FIG. 4 are defined in the lower surface of the board portion 621 according to the present preferred embodiment. Each of the grooves 63 is arranged to extend in a direction perpendicular to both the first and second grooves 71 and 72. Accordingly, at the time of the adhesion, any gas that exists between the bottom plate portion 211 and the board portion 621 can be discharged into the window portion 70 or outwardly of the connector 62 along the groove 63. This leads to an improvement in adhesion of the adhesive layer 41 to each of the bottom plate portion 211 and the board portion 621.

While preferred embodiments of the present invention have been described above, it will be understood that the present invention is not limited to the above-described preferred embodiments.

Each of the first and second grooves may be rectangular as illustrated in FIGS. 5 to 7 or have another shape in a cross-section perpendicular to the groove. For example, each of the first and second grooves may have the shape of the letter "V", the shape of a substantially circular arc, or a polygonal shape other than a rectangle in a cross-section perpendicular to the groove.

In addition, in a plan view, the window portion may have a substantially quadrilateral shape as illustrated in FIG. 3, a shape having a plurality of corner portions other than the substantially quadrilateral shape, a circular shape, or another shape. For example, the window portion may be circular or triangular in the plan view. Further, in a plan view, each of the first and second grooves may have a substantially quadrilateral shape having four corner portions as illustrated in FIG. 3, a shape having a plurality of corner portions other than the substantially quadrilateral shape, a shape having no corner, or another shape. For example, each of the first and second grooves may be circular or triangular in the plan view. Furthermore, each of the first and second grooves may not necessary be in the shape of a closed loop. Furthermore, the first and second grooves may have mutually different shapes in the plan view.

In the above-described preferred embodiment illustrated in FIG. 3, each of the communicating grooves 73 is arranged to extend from a separate one of four corner portions of the first groove 71 to join a corresponding one of four corner portions of the second groove 72 on the outer side, and further extend up to a position outside of the outer circumferential portion of the connector 62. Note, however, that the number of communicating grooves 73 and the position at which each communicating groove 73 extends are not limited to those of the above example.

Figure 9:
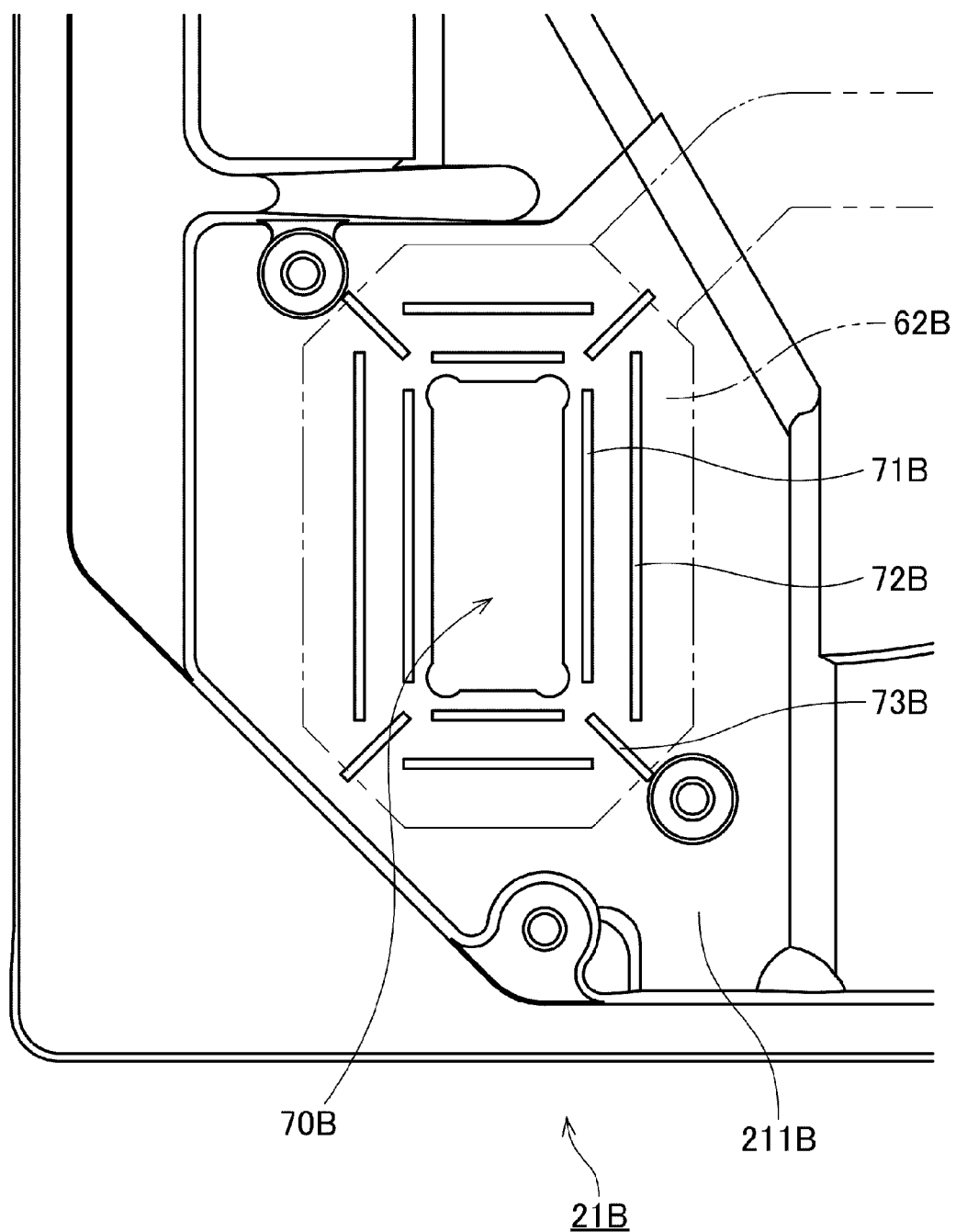
FIG. 9 is a partial top view of a base unit according to a modification of the second preferred embodiment.

FIG. 9 is a partial top view of a base member 21B according to a modification of the above-described second preferred embodiment. In the modification illustrated in FIG. 9, a plurality of first grooves 71B are arranged to surround a window portion 70B with spaces between the first grooves 71B. That is, the first grooves 71B do not define a continuous closed loop around the window portion 70B. In addition, in the modification illustrated in FIG. 9, a plurality of second grooves 72B are arranged to surround the window portion 70B with spaces between the second grooves 72B. That is, the second grooves 72B do not define a continuous closed loop around the window portion 70B. The above arrangement leads to an increase in the area of an upper surface of a bottom plate portion 211B excluding the first and second grooves 71B and 72B. This in turn leads to an increase in strength with which the base member 21B and a connector 62B are fixed to each other.

In addition, in the modification illustrated in FIG. 9, a plurality of communicating grooves 73B are each arranged to extend from a position close to the window portion 70B up to a position outside of an outer circumferential portion of the connector 62B. However, none of the communicating grooves 73B is joined to the first groove 71B or the second groove 72B. Even in this case, since each communicating groove 73B is arranged to be in communication with a space outside of an outer circumference of the connector 62B, any gas that exists in an adhesive, the first groove 71, or the second groove 72 could be discharged outwardly of the connector 62B along the communicating groove 73B.

Figure 10:
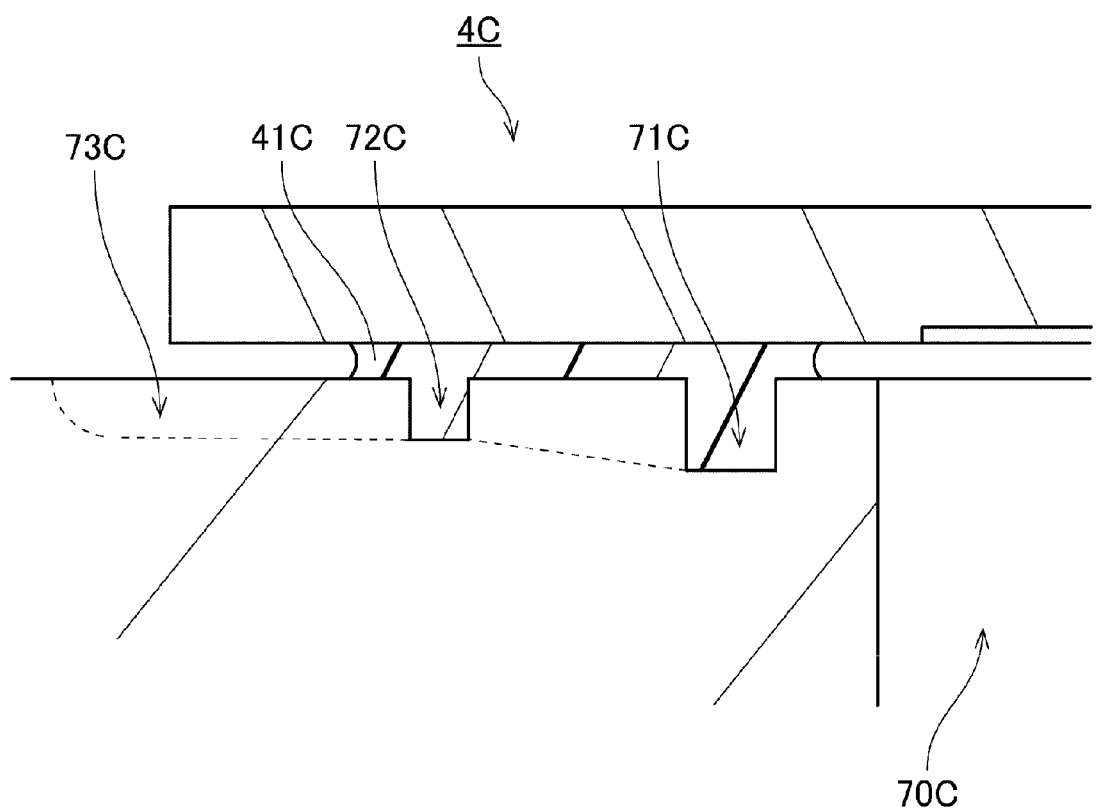
FIG. 10 is a partial vertical sectional view of a base unit according to a modification of the second preferred embodiment.

In the above-described second preferred embodiment, the first and second grooves 71 and 72 are arranged to have substantially the same width and substantially the same depth as illustrated in FIGS. 5 to 7. In this case, because the first groove 71 is closer to the window portion 70 than the second groove 72, and the length of the first groove 71, surrounding the window portion 70, is shorter than the length of the second groove 72, surrounding the window portion 70, in a plan view, the volume of the first groove 71 is smaller than the volume of the second groove 72. To reduce this difference in volume, in a base unit 4C connected to an adhesive layer 41C according to a modification of the above-described second preferred embodiment illustrated in FIG. 10, a first groove 71C connected to a communicating groove 73C may be arranged to have a width greater than that of a second groove 72C and a depth greater than that of the second groove 72C, for example. This arrangement contributes to more effectively preventing an adhesive from protruding into a window portion 70C.

Figure 11:
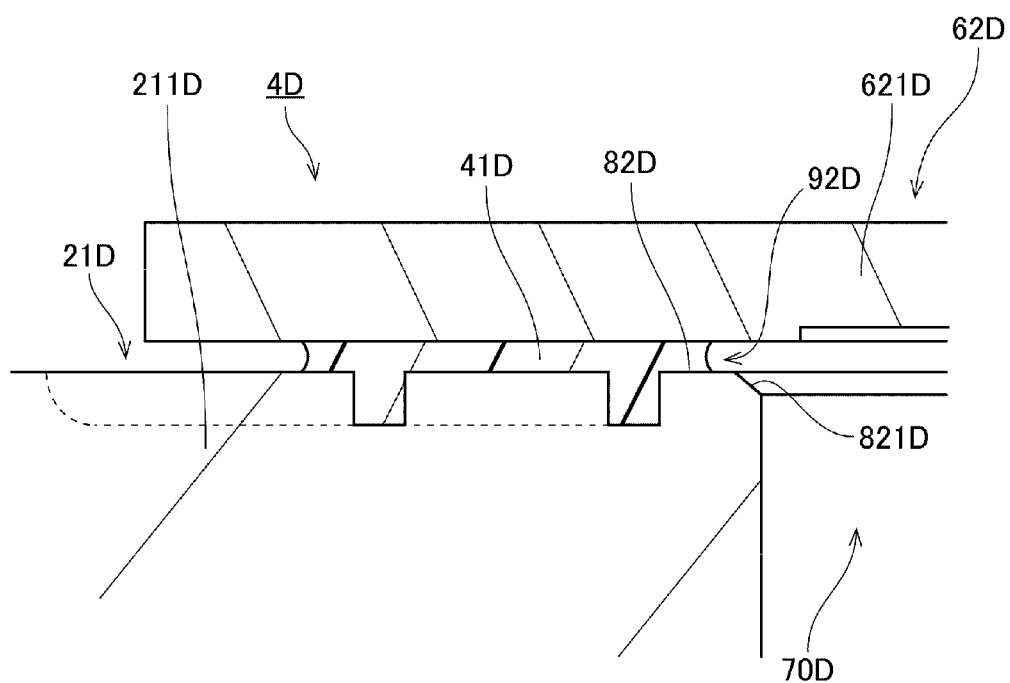
FIG. 11 is a partial vertical sectional view of a base unit according to a modification of the second preferred embodiment.

FIG. 11 is a partial vertical sectional view of a base unit 4D according to another modification of the above-described second preferred embodiment. In the modification illustrated in FIG. 11, a base member 21D includes a slanting surface 821D at or near an end portion of a second base upper surface 82D on the side closer to a window portion 70D. The slanting surface 821D is arranged to decrease in height with decreasing distance from the window portion 70D. As a result, the axial dimension of a second gap 92D increases with decreasing distance from the window portion 70D at or near an end portion of the second gap 92D on the side closer to the window portion 70D. Accordingly, even if an adhesive layer 41D approaches the window portion 70D, an adhesive thereof will be held by surface tension at or near the end portion of the second gap 92D on the side closer to the window portion 70D. This contributes to more effectively preventing the adhesive from protruding into the window portion 70D.

Note that it is sufficient if the slanting surface 821D is defined in one of the second base upper surface 82D and a lower surface of a board portion 621D. It is sufficient if the slanting surface 821D causes the axial dimension of the second gap 92D to increase with decreasing distance from the window portion 70D at or near the end portion of the second gap 92D on the side closer to the window portion 70D. A connector 62D is arranged to have an axial thickness smaller than an axial thickness of a bottom plate portion 211D. Therefore, the slanting surface 821D can be more easily defined in the bottom plate portion 211D than in the connector 62D. In the second base upper surface 82D or the lower surface of the board portion 621D, the slanting surface 821D may be arranged to extend all the way around the window portion 70D, or alternatively, a plurality of slanting surfaces may be arranged with spaces therebetween.

Figure 12:
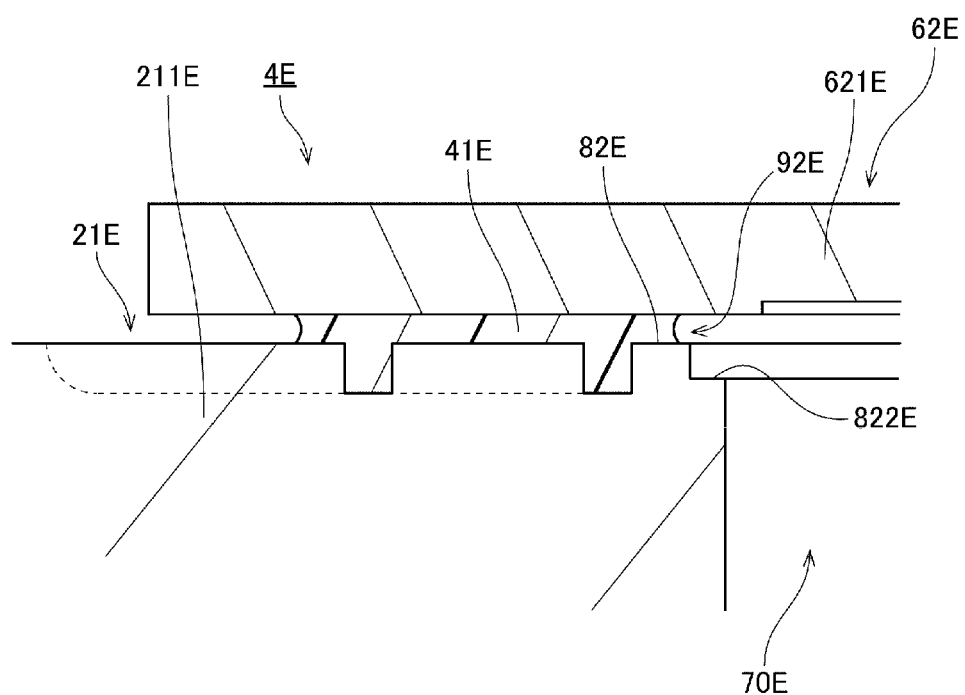
FIG. 12 is a partial vertical sectional view of a base unit according to a modification of the second preferred embodiment.

FIG. 12 is a partial vertical sectional view of a base unit 4E according to yet another modification of the above-described second preferred embodiment. In the modification illustrated in FIG. 12, a base member 21E includes a shoulder portion 822E recessed downward at or near an end portion of a second base upper surface 82E on the side closer to a window portion 70E. This increases the axial dimension of a second gap 92E at or near an end portion of the second gap 92E on the side closer to the window portion 70E. Thus, even if an adhesive layer 41E approaches the window portion 70E, an adhesive thereof will be held on the shoulder portion 822E. This contributes to more effectively preventing the adhesive from protruding into the window portion 70E.

Note that it is sufficient if the shoulder portion 822E is defined in one of the second base upper surface 82E and a lower surface of a board portion 621E. It is sufficient if the shoulder portion 822E increases the axial dimension of the second gap 92E at or near the end portion of the second gap 92E on the side closer to the window portion 70E. A connector 62E is arranged to have an axial thickness smaller than an axial thickness of a bottom plate portion 211E. Therefore, the shoulder portion 822E can be more easily defined in the bottom plate portion 211E than in the connector 62E. In the second base upper surface 82E or the lower surface of the board portion 621E, the shoulder portion 822E may be arranged to extend all the way around the window portion 70E, or alternatively, a plurality of shoulder portions may be arranged with spaces therebetween.

Figure 13:
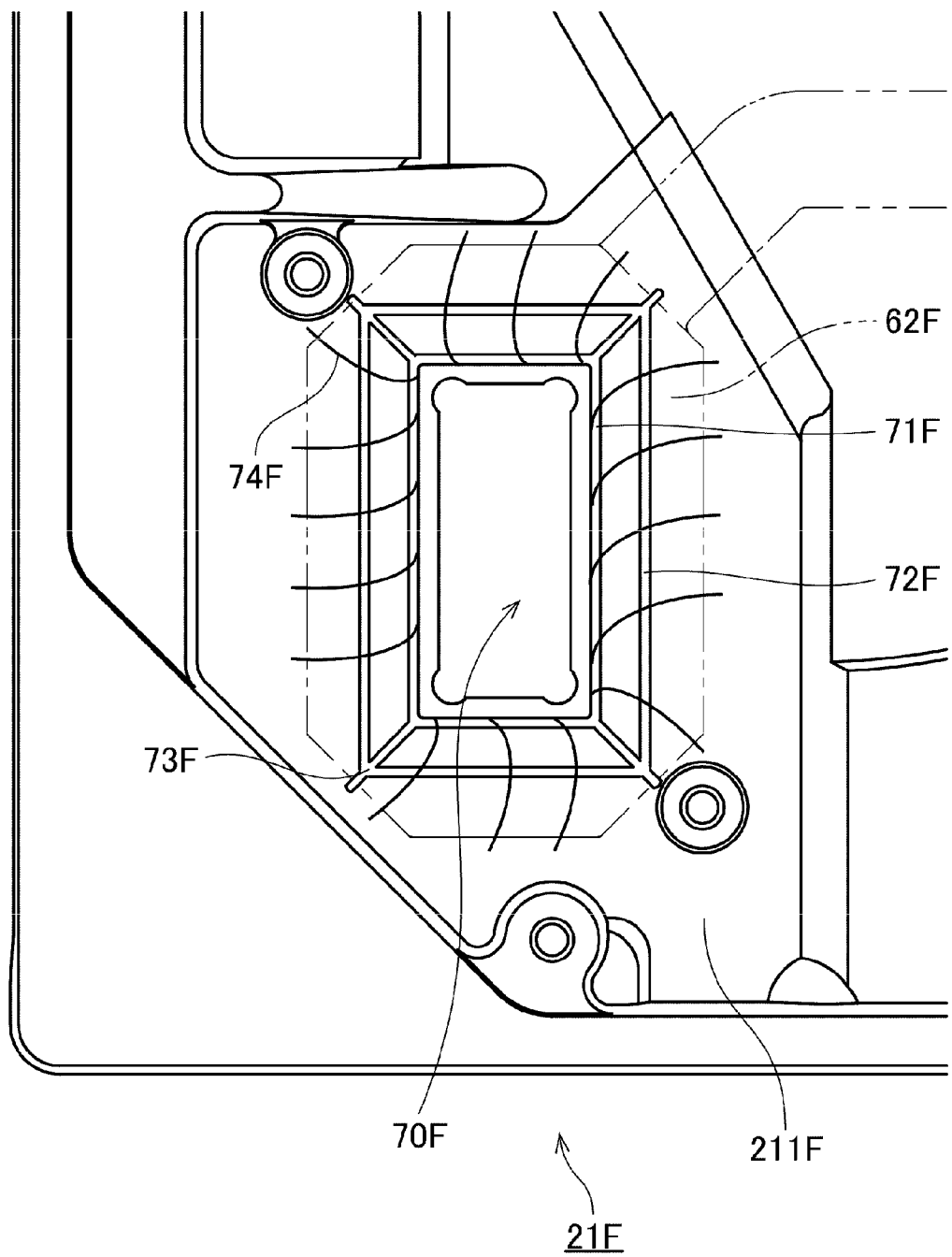
FIG. 13 is a partial top view of a base unit according to a modification of the second preferred embodiment.
Figure 14:
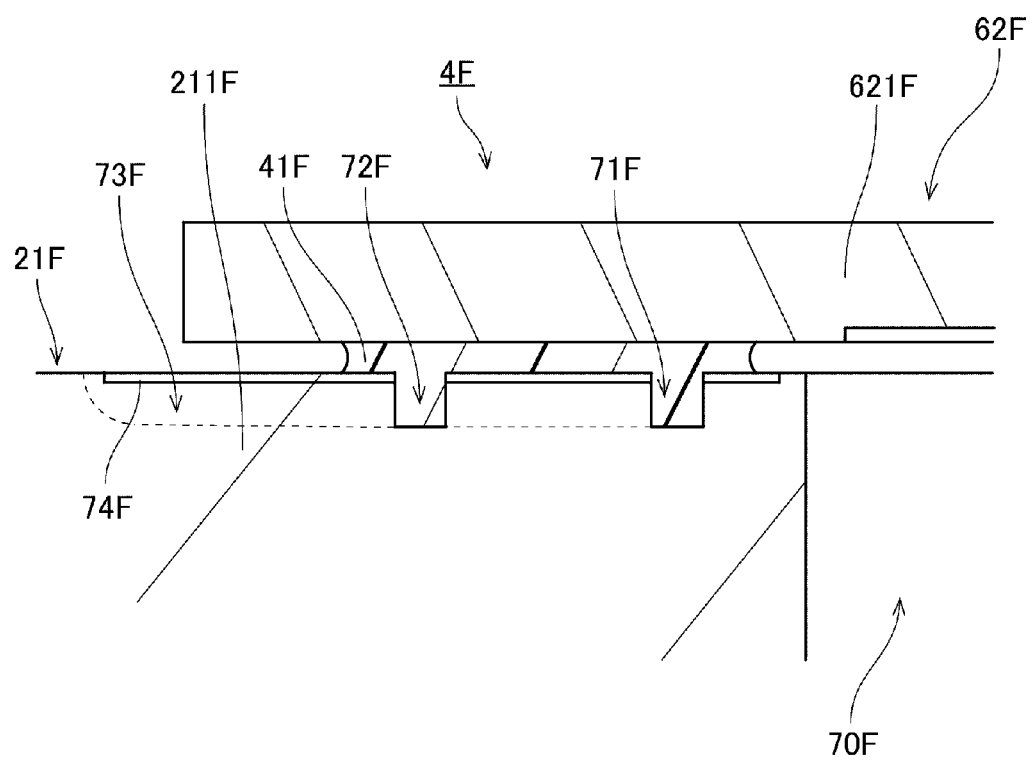
FIG. 14 is a partial vertical sectional view of the base unit according to a modification of the second preferred embodiment.

FIGS. 13 and 14 are a partial top view and a partial vertical sectional view, respectively, of a base unit 4F according to yet another modification of the above-described second preferred embodiment. In the modification illustrated in FIGS. 13 and 14, a surface of a base member 21F includes a plurality of third grooves 74F each of which is arranged to curve gently. Each of the third grooves 74F is arranged to extend from a position close to a window portion 70F in a direction away from the window portion 70F up to a position outside of a connector 62F while crossing a first groove 71F and a second groove 72F connected through a communicating groove 73F. Accordingly, at the time of adhesion, any gas that exists between a bottom plate portion 211F and a board portion 621F can be discharged outwardly of the connector 62F along the third groove 74F. This leads to an improvement in adhesion of an adhesive layer 41F to each of the bottom plate portion 211F and the board portion 621F. Note that each third groove 74F may be defined as a cut mark produced when a mounting surface for the connector 62F on the bottom plate portion 211F is subjected to a cutting process.

Figure 15:
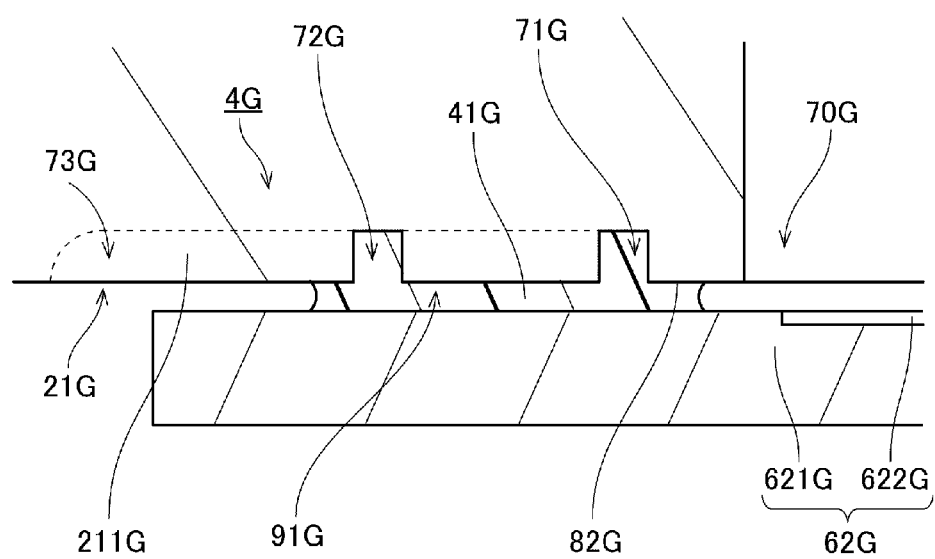
FIG. 15 is a partial vertical sectional view of a base unit according to a modification of the second preferred embodiment.

FIG. 15 is a partial vertical sectional view of a base unit 4G with a base member 21G according to yet another modification of the above-described second preferred embodiment. In the modification illustrated in FIG. 15, a board portion 621G of a connector 62G is arranged on a lower surface 82G of a bottom plate portion 211G. In addition, the board portion 621G is arranged to cover a window portion 70G, a first groove 71G, a second groove 72G, and a portion of a communicating groove 73G. An electrode terminal 622G is arranged on an upper surface of the board portion 621G. That is, the electrode terminal 622G is arranged on a lower side of the window portion 70G. In addition, an adhesive layer 41G is arranged in a gap 91G between the bottom plate portion 211G and the upper surface of the board portion 621G. An electric drive current for a disk drive apparatus 1 may be supplied from an external power supply to an interior of the disk drive apparatus 1 through the connector 62G, with the connector 62G being arranged on the lower surface of the bottom plate portion 211G as described above. Note that each of the first groove 71G, the second groove 72G, and the communicating groove 73G is defined in the lower surface of the bottom plate portion 211G.

Note that the detailed shape of any member may be different from the shape thereof as illustrated in the accompanying drawings of the present application. Also note that features of the above-described preferred embodiments and the modifications thereof may be combined appropriately as long as no conflict arises.

Preferred embodiments of the present invention are applicable to, for example, base units, spindle motors, and disk drive apparatuses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A base unit for use in a disk drive apparatus including a case an interior of which is filled with helium, hydrogen, a gas mixture of helium and hydrogen, or a gas mixture of air and any one of helium, hydrogen, and the gas mixture of helium and hydrogen, the base unit comprising:
   a base member arranged to support a motor; and
   a connector electrically connected to a head included in an access portion arranged to perform at least one of reading and writing of information from or to a disk supported by a rotating portion of the motor; wherein
   the base member includes:
   a bottom plate portion arranged to extend perpendicularly to a central axis of the motor;
   a window portion arranged to pass through the bottom plate portion in an axial direction; and
   a first groove defined in an upper surface or a lower surface of the bottom plate portion around the window portion;
   the connector includes:
   a board portion arranged on the upper surface or the lower surface of the bottom plate portion, and arranged to cover the window portion and at least a portion of the first groove; and
   an electrode terminal arranged on the board portion;
   the electrode terminal is arranged on an upper or lower side of the window portion;
   an adhesive layer is arranged between the bottom plate portion and a surface of the board portion facing the bottom plate portion;
   the adhesive layer is arranged to define a continuous closed loop around the window portion;
   a portion of the adhesive layer is held in at least a portion of the first groove; and the first groove includes at least one communicating groove arranged to extend up to a position outside of an outer circumferential portion of the connector.

2. The base unit according to claim 1, wherein the first groove is arranged to define a continuous closed loop around the window portion.

3. The base unit according to claim 2, wherein
the first groove includes a plurality of corner portions around the window portion; and
each of the at least one communicating groove is arranged to extend from one of the corner portions up to the position outside of the outer circumferential portion of the connector.

4. The base unit according to claim 1, wherein the first groove includes a plurality of first-sub-grooves arranged to surround the window portion with spaces between the plurality of first sub-grooves.

5. The base unit according to claim 1, wherein
the base member further includes a first base surface arranged to extend from an edge portion of the first groove on an outer side with respect to the window portion to the outer side;
a first gap is defined between the first base surface and the surface of the board portion facing the bottom plate portion; and
at least a portion of the adhesive layer is arranged to extend from inside the first groove into the first gap.

6. The base unit according to claim 5, wherein
the base member further includes a second groove arranged on the outer side of the first base surface; and
at least a portion of the adhesive layer is arranged to extend from inside the first groove into the second groove through the first gap.

7. The base unit according to claim 6, wherein the second groove is arranged to define a continuous closed loop around the first base surface.

8. The base unit according to claim 1, wherein
the base member further includes a second base surface arranged to extend between the first groove and the window portion;
a second gap is defined between the second base surface and the surface of the board portion facing the bottom plate portion; and
the second base surface includes a shoulder portion arranged to increase an axial dimension of the second gap at or near an end portion of the second gap on a side closer to the window portion.

9. The base unit according to claim 1, wherein
the base member further includes a plurality of third grooves each of which is arranged to extend in such a direction as to cross the first groove; and
at least one of the third grooves is arranged to extend up to a position outside of the outer circumferential portion of the connector.

10. The base unit according to claim 1, wherein the connector is arranged on the lower surface of the bottom plate portion.

11. A spindle motor comprising:
the base unit of claim 1;
a bearing mechanism fixed to the base unit; and
a rotating portion rotatably supported by the bearing mechanism.

12. A disk drive apparatus comprising:
the spindle motor of claim 11;
an access portion arranged to perform at least one of reading and writing of information from or to a disk supported by the rotating portion of the spindle motor; and
a cover; wherein
the rotating portion and the access portion are housed in a case defined by the base member and the cover; and
an interior of the case is filled with helium, hydrogen, a gas mixture of helium and hydrogen, or a gas mixture of air and any one of helium, hydrogen, and the gas mixture of helium and hydrogen.

* * * * *